(12) United States Patent
Fux

(10) Patent No.: US 6,415,925 B1
(45) Date of Patent: Jul. 9, 2002

(54) PACKAGING TRAY

(75) Inventor: Rudolf Fux, Eschenburg (DE)

(73) Assignee: Tiromat Krämer + Grebe GmbH & Co. KG, Beidenkopf-Wallau (DE)

( * ) Notice: Subject to any disclaimer, the term of this patent is extended or adjusted under 35 U.S.C. 154(b) by 0 days.

(21) Appl. No.: 09/341,231

(22) PCT Filed: Dec. 12, 1997

(86) PCT No.: PCT/EP97/06991
§ 371 (c)(1),
(2), (4) Date: Sep. 2, 1999

(87) PCT Pub. No.: WO98/30467
PCT Pub. Date: Jul. 16, 1998

(30) Foreign Application Priority Data

Jan. 6, 1997 (DE) .......................... 197 00 154

(51) Int. Cl.⁷ ................................................ B65D 1/34
(52) U.S. Cl. ...................................................... 206/557
(58) Field of Search ............................... 206/205, 557, 206/561

(56) References Cited

U.S. PATENT DOCUMENTS

| | | | |
|---|---|---|---|
| 3,040,949 A | | 6/1962 | Foote |
| 3,209,978 A | * | 10/1965 | Dupuis ...................... 206/205 |
| 3,346,400 A | | 10/1967 | Roesner |
| 3,409,199 A | | 11/1968 | Lake |
| 3,589,592 A | * | 6/1971 | Tigner ........................ 229/3.5 |
| 3,863,833 A | * | 2/1975 | Swett et al. ........... 206/557 XZ |
| 4,702,377 A | * | 10/1987 | Grone ........................ 206/557 |
| 5,460,861 A | * | 10/1995 | Vicik et al. ................ 428/34.9 |
| 5,972,445 A | * | 10/1999 | Kimura et al. ............. 428/35.4 |

FOREIGN PATENT DOCUMENTS

| | | |
|---|---|---|
| DE | 81 38 058.8 U | 6/1982 |
| DE | 40 41 461 A1 | 7/1992 |
| EP | 0 690 013 A1 | 1/1996 |
| FR | 2 545 453 A1 | 11/1984 |
| WO | WO 91/13933 | 9/1991 |

OTHER PUBLICATIONS

International Search Report dated Apr. 4, 1998 of parent PCT Application No. PCT/EP97/06991.

* cited by examiner

Primary Examiner—David T. Fidei
(74) Attorney, Agent, or Firm—Akin, Gump, Strauss, Hauer & Feld, L.L.P.

(57) ABSTRACT

The invention concerns a packaging tray (1) suitable for permanently holding liquid (5) escaping from a packaged article (6). At least on and/or in its base wall (2) the packaging tray (1) has at least one cylindrical bulge (4) which is open towards the interior of the packaging tray (1) and whose diameter, which remains constant over the entire depth of the bulge (4), is between 2 and 6 mm, its depth being 1.5-times the diameter. The invention also concerns a corresponding packaging device.

18 Claims, 3 Drawing Sheets

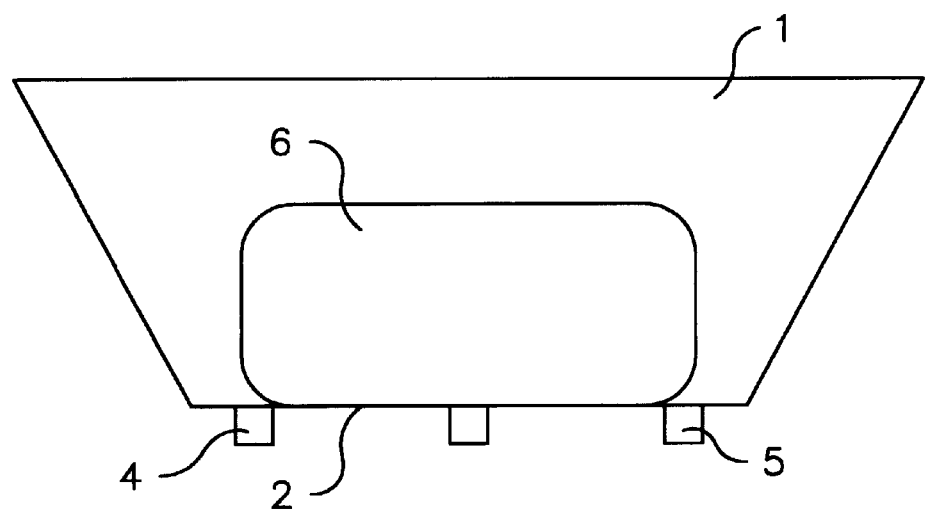
*Fig. 1a*
*Fig. 1b*
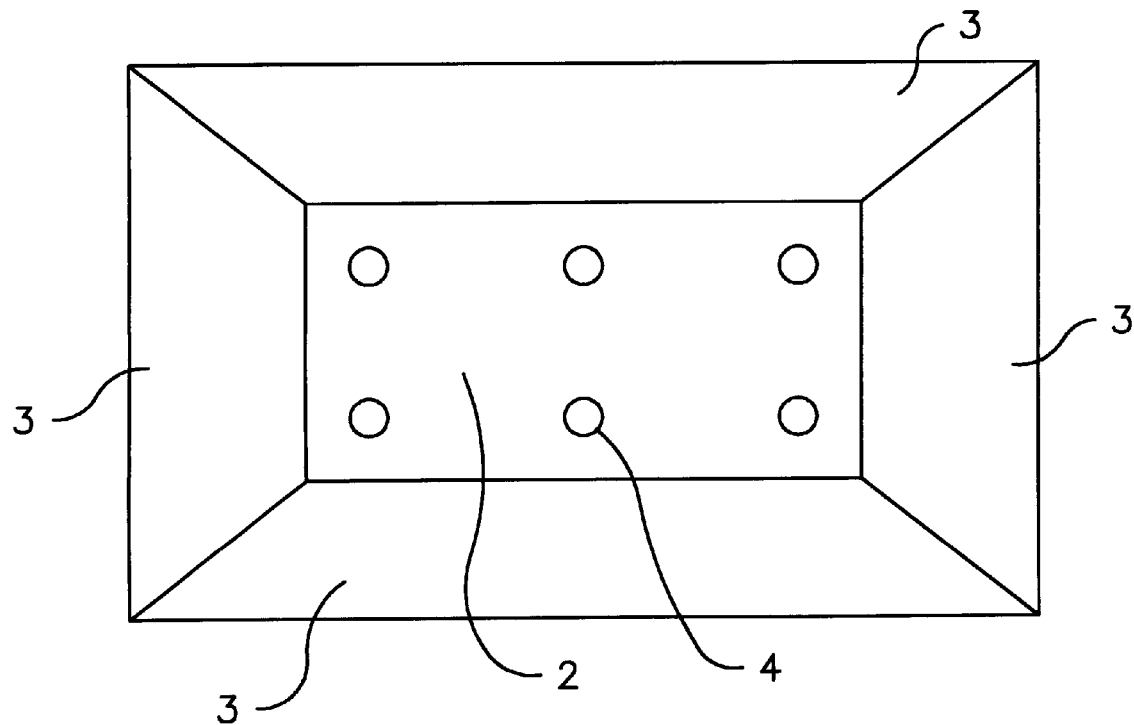

PACKAGING TRAY

BACKGROUND OF THE INVENTION

The present invention relates to a packaging tray suitable for permanently holding liquid exuding from a packaged article, which tray at least on and/or in its base wall has at least one cylindrical bulge which is open towards the interior of the packaging tray, the diameter of which, remaining constant over the entire depth of the bulge, being between 2 and 6 mm, and the depth of which being 1.5 times the diameter, and to a corresponding package.

The present invention also relates to a method of permanently separating a packaged article, such as a foodstuff, from liquid exuding therefrom by packaging the article in a packaging tray according to the invention, collecting and holding the liquid exuding from the packaged article in the bulges of the packaging tray of the invention, the total volume of the overall bulges in the packaging tray being required to correspond at least to the volume of the liquid to be collected, and to a correspondingly packaged article.

The preservation of foodstuffs is gaining more and more importance today. In addition to preservation by deep-freezing, foodstuffs are increasingly packaged in preferably gas-tight films. It is particularly important in this type of package that the packaged articles such as meat, fish and/or vegetables be separated as completely as possible from liquid exuding therefrom during storage, because microorganisms tend to grow in such a liquid, initiating a putrefaction process of the packaged foodstuffs.

In the past, attempts have been made to absorb these liquids, such as water, blood and/or cell plasma, in absorbent fleeces inserted between the packaged article and the packaging tray.

This procedure is disadvantageous in that, on the one hand, the packaged article is not actually separated from the exuded liquid, because the article is lying on the fleece having absorbed the liquid. On the other hand, the fleece soaked with liquid, frequently adhering to the packaged article, does not present an optically attractive view for a consumer.

It was therefore the object to provide a package which collects the liquid exuding from the packaged article, permanently separating it from the packaged article during the time of storage, and does not involve the above-described drawbacks.

SUMMARY OF THE INVENTION

According to the invention, said object is solved by providing a packaging tray which at least on and/or in its base wall has at least one cylindrical bulge which is open towards the interior of the packaging tray, the diameter of which, remaining constant over the entire depth of the bulge, being between 2 and 6 mm, and the depth of which being 1.5 times the diameter.

The minimum number of bulges is estimated according to the expected amount of liquid exuding from the packaged article. Said amount of liquid is determined according to methods for determining the percentage of moisture in the article to be packaged, which are common for a person skilled in the art.

However, the total volume of the bulges preferably is by 50–60% larger than the volume of exuded liquid expected in order to ensure separation of the liquid from the packaged article.

Undesirable liquid is retained by capillary action in the bulges of the packaging tray according to the invention. The maximum possible diameter of a bulge depends on the surface tension between the packaging material and the liquid to be retained and may be determined using a well-known, easy measurement.

It is preferred to arrange the bulges at regular spacings on and/or in the packaging tray, and the bulges may be arranged both on the base wall and the side walls of the packaging tray.

However, it is particularly preferred to arrange the bulges on and/or in the base wall of the packaging tray.

In this fashion, the bulges may also serve as feet for the packaging tray and therefore, they must be arranged such that the packaging tray is in a horizontal position thereon.

The packaging tray of the invention is preferably made of thermoplastic polymer materials common in packaging foodstuffs, such as polypropylenes, polyethylenes, polyesters, polycarbonates, polyethylene naphthalates, or polystyrenes. Deep-drawable and dimensionally stable single-layer or multilayer films are particularly suited for producing such a packaging tray.

It is highly preferred to produce the packaging tray from a foamed film based on polypropylene, the use of a high melt strength polypropylene being particularly preferred.

High melt strength polypropylenes are manufactured by the Himont Company, for example, and may be mixed with conventional polypropylenes in a ratio of 1:1.

The polypropylene is optionally mixed with a copolymer of propylene and ethylene. The ethylene percentage of the copolymer is between 1 and 10 wt.-%.

The packaging tray is preferably produced from a multi-layered film containing functional layers. On the one hand, functional layers are common barrier layers having low permeability for oxygen, nitrogen, carbon dioxide, and/or water vapor, and on the other hand, the well-known sealing layers and primer layers.

It is particularly preferred to produce the packaging tray from a multilayered barrier film having the following structure:

A A foamed support layer produced from a mixture of 50 wt.-% of a high melt strength polypropylene and 50 wt.-% of a conventional polypropylene, or a copolymer of propylene and ethylene, the ethylene percentage being 1–10 wt.-%. The polypropylene is foamed using a chemical or physical blowing agent. The thickness of the foamed layer is between 500 and 800 $\mu$m.

B A thermoplastic primer layer joining the layers A and C.

C A five-layered film which is structured as follows:
  a polypropylene layer
  a primer layer
  a barrier layer made of polyethylene vinyl alcohol (including about 35 wt.-% of vinyl alcohol),
  a primer layer
  a sealing layer made of low density polyethylene (LDPE), or a peelable sealing layer made of a mixture of LDPE and polybutylene.

Following filling, the packaging trays of the invention, produced by thermoforming, preferably by deep-drawing, are preferably sealed with well-known cover films which may be multilayered films having a layer sequence of, e.g., polyethylene terephthalate (PET), poly(vinylidene chloride) (PVDC)/adhesive/LDPE or PET/adhesive//PE/primer/EVOH/primer/PE.

Films having the structure PET/SiO$_x$//adhesive//LDPE are particularly suited as cover films. Such a film is remarkable for its particularly high transparency and a high crossbreaking resistance. A package tray sealed therewith has a particularly high gas barrier.

Using the packaging tray of the invention, it is possible to permanently separate the packaged article from—mostly aqueous—liquid exuding therefrom and thus, keep the packaged article dry even upon prolonged storage.

Therefore, the present invention is also directed to a method of permanently separating a packaged article from liquid exuding therefrom by packaging the article in a packaging tray according to the invention, the exuding liquid being collected in the bulges thereof and retained therein, the total volume of said bulges being required to correspond at least to the volume of the liquid to be collected.

However, the total volume of the bulges is preferably dimensioned to be >50% of the expected volume of liquid exuding from the packaged article.

The volume of the liquid exuding from the packaged article can be estimated on the basis of amount, type and quality of the packaged article. For a more precise determination of the amount of liquid to be collected, well-known methods such as those used in food chemistry to determine the amount of moisture may be utilized.

In the package according to the invention, meat (fresh), fish and/or vegetables can be stored in packaged condition, permanently separated from exuding liquid which is aqueous in most cases, such as water, blood and/or cell plasma.

Inter alia, one advantage of the package according to the invention therefore is that the packaged article remains permanently separated from liquid exuding therefrom. As a result, the packages and/or the packaged articles are optically more attractive and more durable.

BRIEF DESCRIPTION OF THE DRAWINGS

Some examples of the packaging tray according to the invention, the advantages and the production thereof will be illustrated with reference to the appended figures:

FIG. 1a shows a packaging tray according to the invention with a packaged article in side view, and FIG. 1b shows the packaging tray with no packaged article in top view.

DETAILED DESCRIPTION OF THE INVENTION

Figure 2B:
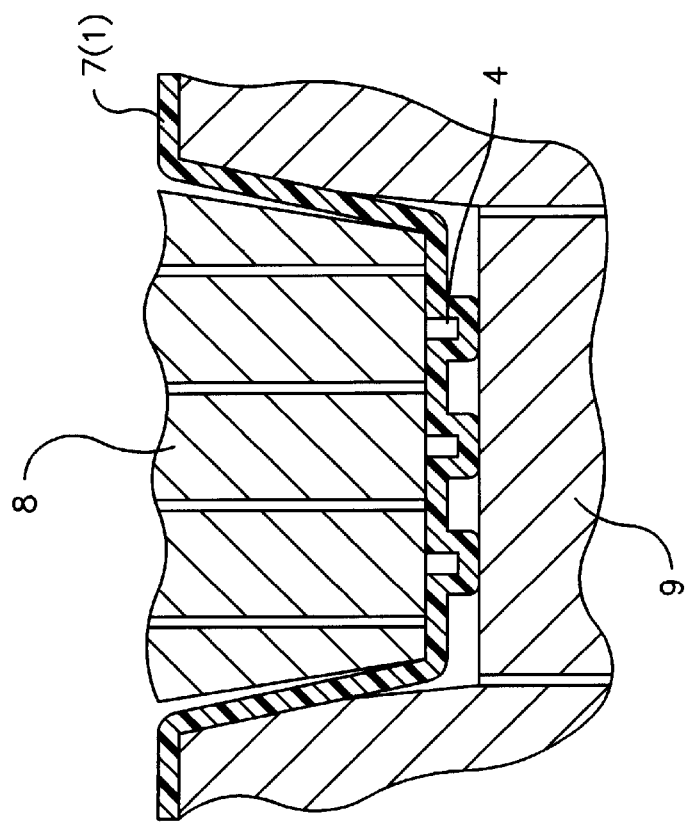
FIG. 2b shows a cross section similar to FIG. 2a with the packaging tray in a molded condition.

FIG. 1a illustrates a packaging tray (1) according to the invention, consisting of a base wall (2) and four side walls (3). The base wall (2) has cylindrical bulges (4) open towards the interior of the packaging tray. The liquid (5) released by the packaged article (6) during storage is situated in the bulges (4). In FIG. 1b the packaging tray is illustrated with no packaged article (6).

Figure 2A:
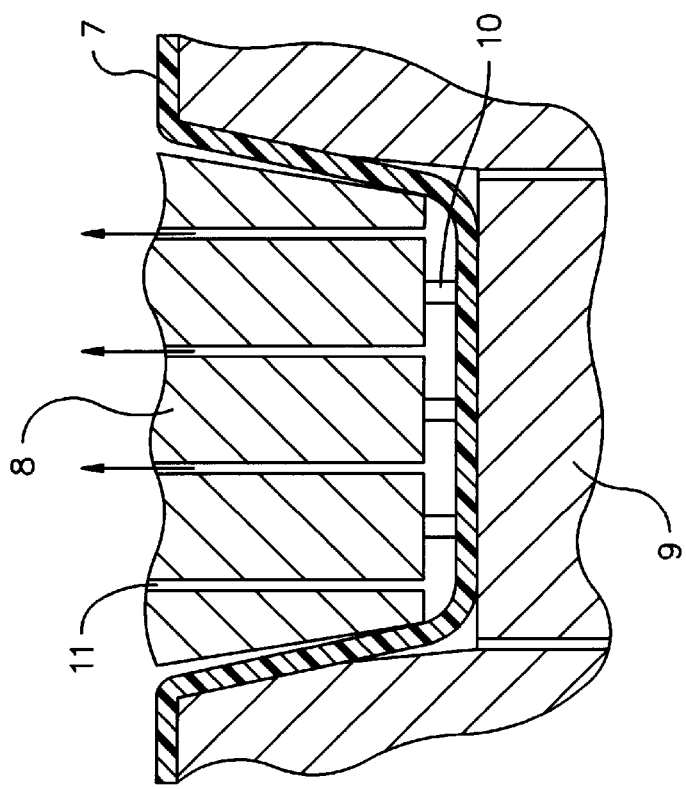
FIG. 2a shows a cross section of a packaging tray and a thermoforming mold during a first stage of a molding operation for producing a packaging tray according to the invention.

FIG. 2 shows the production of a packaging tray of the invention according to FIG. 1, the base wall of which has regularly spaced cylindrical bulges. This tray is produced from a multilayered packaging film (7) by thermoforming between two tools (8) and (9), tool (8) of these, which molds the inner side of the packaging tray, having on its underside regularly spaced cylindrical elevations (10). FIG. 2a illustrates a type of thermoforming wherein the packaging tray is molded between said two tools (8) and (9). A vacuum is applied in the tool (8) through channels (11), so that the heated film is molded around the elevations on tool (8), thereby forming the bulges in the base wall of the packaging tray as illustrated in FIG. 2b. The usual measures of such vacuum thermoforming fall under the state of the art.

Figure 3B:
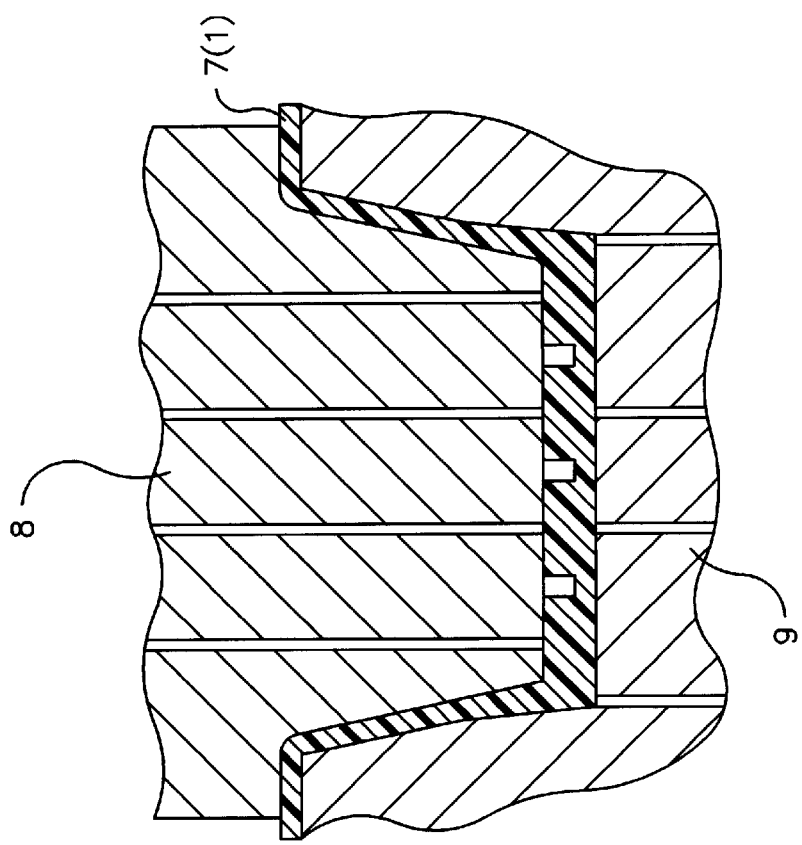
FIG. 3b shows a cross section similar to FIG. 3a with the packaging tray in a molded condition.
Figure 3A:
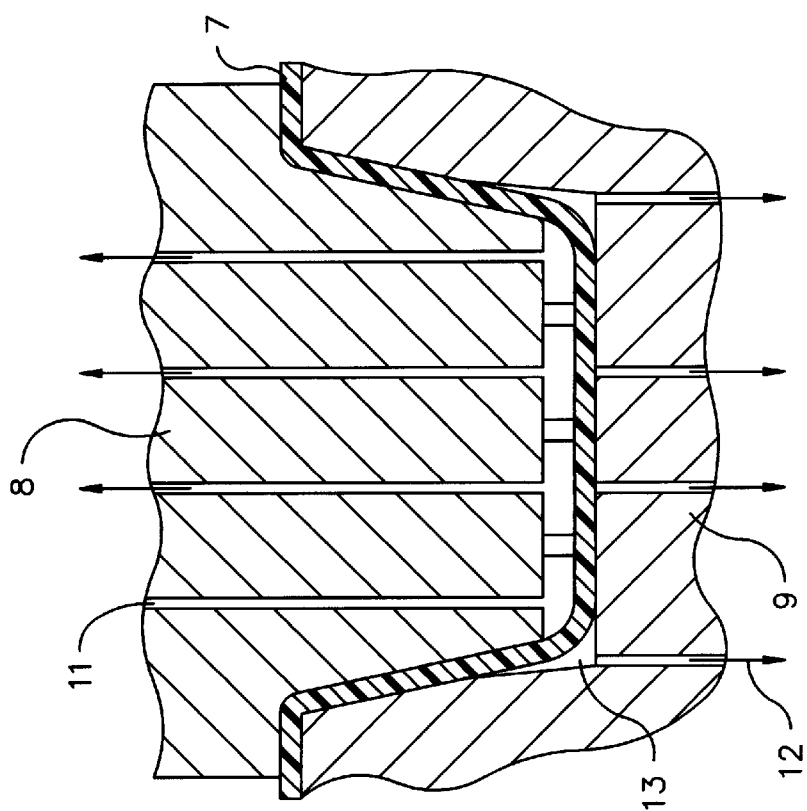
FIG. 3a shows a cross section of a packaging tray and a combination thermoforming and vacuum forming mold during a first stage of a molding operation for producing a packaging tray according to the invention.

FIG. 3 illustrates the production of a packaging tray according to the invention by thermoforming in combination with vacuum expansion. To this end, the multilayered packaging film from which the tray is produced must have at least one layer made of a foamed thermoplastic material, such as foamed polypropylene. As illustrated in FIG. 3a, the packaging film (7) is inserted between the two tools (8) and (9) in order to produce the packaging tray by thermoforming. By applying a vacuum in the channels (11) and/or (12) in both tools (8) and (9), the foamed layer can be broadened where exposed to vacuum. To this end, the thermoplastic material must be heated to at least such a level as to allow forming by plastication. In particular, by evacuating the gap (13) between the two tools (8) and (9), the foamed film can expand in the base area of the packaging tray to be produced and fill the entire cavity between the two tools, thereby producing the bulges in the base wall of the packaging tray of the invention by means of the elevations (10) on tool (8).

Depending on the packaging material and the thermoforming parameters, it is possible to produce packaging trays that look between the ones in FIG. 2b and FIG. 3b. Depending on the situation whether a packaging material having at least one foamed layer is used, and whether a vacuum is applied to one or both sides of the tool, the foamed film will undergo more or less expansion, and as a result, the bulges will either remain in the packaging material or protrude more or less from the base wall and optionally from the side walls.

In addition, packaging trays of the invention may also be produced in an appropriate form by injection molding, using well-known injection molding processes.

I claim:

1. A packaging tray (1) suitable for permanently holding a volume of liquid (5) exuding from a packaged article (6), the packaging tray (1) comprising: a base wall (2); at least one cylindrical bulge (4) formed on the base wall to receive the exuding liquid, the at least one cylindrical bulge being open towards an interior of the packaging tray and having a diameter and a depth, the diameter remaining constant over the entire depth of the bulge and being in the range of about 2 and 6 mm, and the depth being 1.5 times the diameter, such that the volume of liquid is permanently held in the at least one cylindrical bulge through at least one of capillary action and surface tension of the liquid.

2. The packaging tray according to claim 1, wherein the total volume of the at least one bulge corresponds at least to the volume of exuding liquid.

3. The packaging tray according to claim 2, wherein the at least one bulge comprises a plurality of bulges, the bulges (4) being arranged at regular spacings on the base wall.

4. The packaging tray according to claim 1, wherein the packaging tray (1) comprises a thermoplastic packaging material.

5. The packaging tray according to claim 4, wherein the packaging material is one of a single-layer and multilayer film with one layer constructed of a polypropylene foam.

6. The packaging tray according to claim 5, wherein the polypropylene is a high melt strength polypropylene.

7. A packaging tray (1) suitable for permanently holding a volume of liquid (5) exuding from a packaged article (6), the packaging tray (1) comprising: a base wall (2); at least one cylindrical bulge (4) formed on the base wall to receive the exuding liquid, the at least one cylindrical bulge being open towards an interior of the packaging tray and having a diameter and a depth, the diameter remaining constant over the entire depth of the bulge and being in the range of about 2 and 6 mm, and the depth being 1.5 times the diameter, such that the volume of liquid is permanently held in the at least one cylindrical bulge through at least one of capillary action and surface tension of the liquid, wherein the packaging tray (1) is constructed of a thermoplastic material and comprises a multilayered film with one layer constructed of a polypropylene foam and at least one further layer taken from the group consisting of a primer layer, a barrier layer, and a sealing layer.

8. A package for holding an article, the package comprising: the packaging tray according to claim 1, and a cover extending over the packaging tray.

9. The package according to claim 8, wherein the cover comprises a multilayered film having layers taken from the group consisting of a primer layer, a barrier layer, and a sealing layer.

10. The package according to claim 8, and further comprising an article that is located between the packaging tray and the cover, the article being permanently separated from liquid exuding therefrom.

11. A method of permanently separating a packaged article from liquid exuding therefrom, the method comprising: packaging an article in a packaging tray (1) according to claim 1; collecting and holding liquid exuding from the packaged article in said at least one bulge, the total volume of the at least one bulge corresponding at least to the volume of the liquid to be collected.

12. The method according to claim 11, wherein the total volume of the at least one bulge corresponds to 1.5 times the volume of the liquid to be collected.

13. The method according to claim 11, wherein the article is a food article selected from the group consisting of meat, fish and vegetables.

14. The packaging tray according to claim 1, wherein the at least one bulge (4) protrudes from the base wall (2).

15. The packaging tray according to claim 1, wherein the range of bulge diameters and the depth of 1.5 times the bulge diameter enable a total volume of the at least one bulge to be filled by an equal volume of the exuded liquid.

16. The packaging tray according to claim 15, wherein the range of bulge diameters and the depth of 1.5 times the bulge diameter cause the equal volume of the exuded liquid to be permanently held in the at least one bulge.

17. The packaging tray according to claim 1, wherein the at least one bulge comprises a plurality of bulges.

18. The packaging tray according to claim 7, wherein the at least one bulge comprises a plurality of bulges.

* * * * *